(No Model.)　　　　　　　　　　　　　　　　2 Sheets—Sheet 1.
J. W. FREE & M. A. BARBER.
MALT STIRRING MACHINE.

No. 413,138.　　　　　　　　　Patented Oct. 15, 1889.

WITNESSES　　　　　　　　　　　　　INVENTORS.

(No Model.) 2 Sheets—Sheet 2.

J. W. FREE & M. A. BARBER.
MALT STIRRING MACHINE.

No. 413,138. Patented Oct. 15, 1889.

WITNESSES.
J. M. Dolan
A. L. Macdonald

INVENTORS
John W. Free
Michael A. Barber
by their atty
Clarke & Raymond

UNITED STATES PATENT OFFICE.

JOHN WASHINGTON FREE, OF BOSTON, MASSACHUSETTS, AND MICHAEL A. BARBER, OF NORWICH, CONNECTICUT.

MALT-STIRRING MACHINE.

SPECIFICATION forming part of Letters Patent No. 413,138, dated October 15, 1889.

Application filed February 4, 1889. Serial No. 298,633. (No model.)

*To all whom it may concern:*

Be it known that we, JOHN WASHINGTON FREE, of Boston, in the county of Suffolk and State of Massachusetts, and MICHAEL A. BARBER, of Norwich, in the county of New London and State of Connecticut, have invented a new and useful Improvement in a Malt-Stirring Machine, of which the following is a specification, reference being had to the accompanying drawings, forming a part of this specification.

Figure 1:
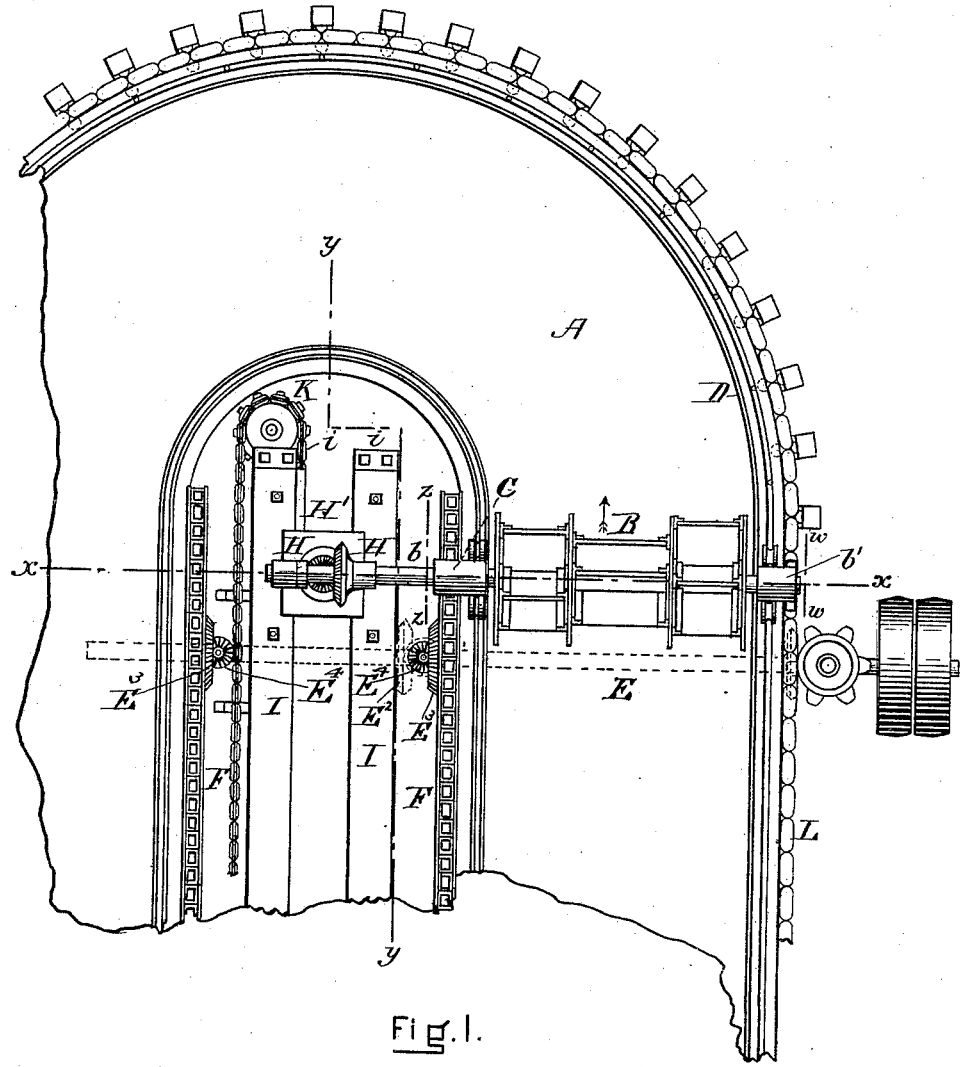
Figure 2:
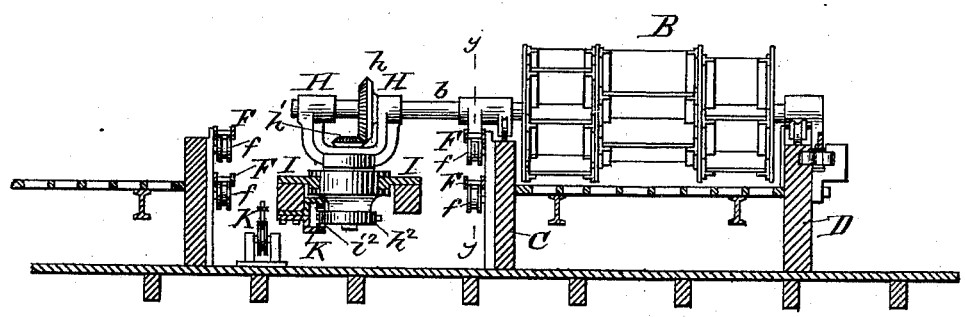
Figure 3:
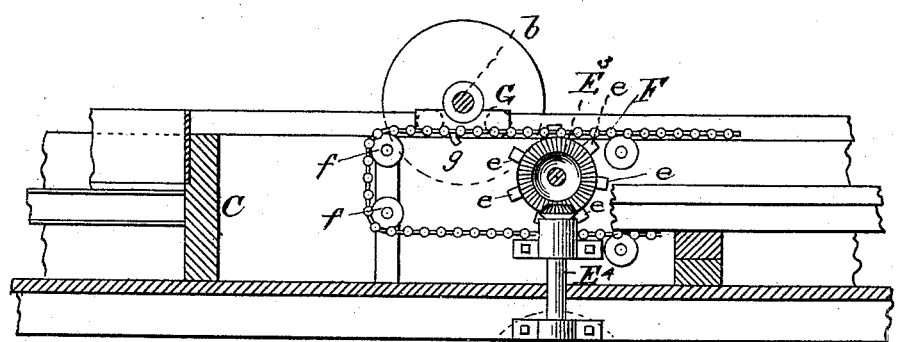
Figure 5:
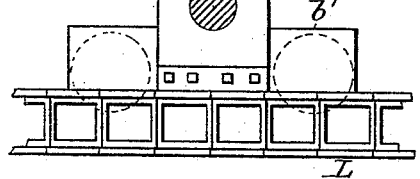
Figure 4:
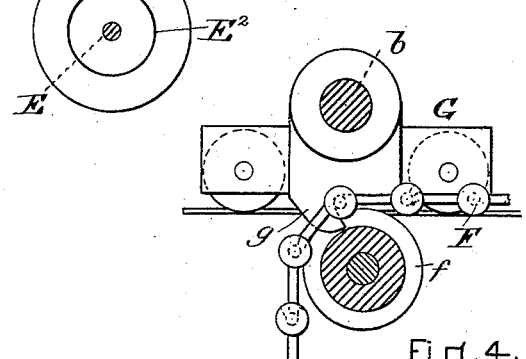

In the drawings, Figure 1 is a plan of the apparatus at one end, showing the actuating mechanism. Fig. 2 is a vertical section on the line $x\,x$ of Fig. 1. Fig. 3 is a vertical section transverse to Fig. 2 and on the line $y\,y$ of Fig. 1. Fig. 4 is an enlarged view of the carriage and hook shown in Fig. 3, and is taken on the line $z\,z$ of Fig. 1. Fig. 5 is an enlarged view of the carriage and chain upon the exterior of the wall of the machine, shown in Fig. 1, and is taken on the line $w\,w$ of Fig. 1.

It often happens in erecting malt-making machines that it is desirable to have them oblong rather than circular, and it is also desirable that the work of the machine should be continuous and in one direction of travel instead of reciprocating. It is to adapt the mechanism to these conditions that this machine has been devised.

A is the malting-floor. It is shaped like an amphitheater.

B is the stirring-wheel.

C is the inner wall of the malting-floor, and D is the outer wall of the malting-floor.

E (shown in dotted lines on Fig. 1) is the main driving-shaft. This shaft transmits its power by a bevel-wheel $E^2$ and a corresponding bevel-wheel upon the opposite side of the axis of the machine to bevel-gears mounted upon short shafts, which are shown in the drawings, Fig. 3, and lettered $E^4$. These short shafts $E^4$, armed with bevel-gears at top and bottom, engage the bevel-gears $E^3$, (shown in Fig. 1,) running one of them in one direction and the other in the other. These bevel-gears $E^3$, as shown in Fig. 3, are provided with sprocket-arms $e$, which sprocket-arms $e$ serve to engage a chain F. This chain F, as shown in Fig. 2, has flanges which serve to guide it over the guide-pulleys $f$ of Fig. 3, which guide-pulleys $f$ are double-flanged pulleys in order to allow of the engagement of the hook $g$ (shown in Fig. 3) with the chain. This hook $g$ is attached to the inner carriage G, in which rotates the stirrer-shaft $b$. The outer end of the stirrer-shaft is carried by another carriage $b'$, the details of which are shown in Fig. 5. The inner end of the stirrer-shaft $b$ is mounted in a yoke H, which yoke is pivoted in a sliding block $H'$, and the shaft $b$ carries a bevel-gear $h$, which meshes into another bevel-gear $h'$, which passes through the axis of the block $H'$ and is provided on its lower end with a sprocket-wheel $h^2$. The block $H'$ slides to and fro lengthwise of the machine in ways I. A sprocket-chain K, shaped in cross-section like the double obelisk of the printer, as shown in Fig. 2, is run from the main shaft E and actuates the sprocket-wheel $h^2$ and drives the bevel-gearing $h\,h'$, causing the shaft $b$ to revolve. Another chain L upon the exterior of the machine engages with the carriage $b'$ and moves it along, being geared in connection with the main shaft to run at the same rate as the chain F. Stops $i$ are arranged at the ends of the ways I. It will be seen by this arrangement that as the chains F and L move at the same rate the traverse of the stirring-wheel B along the sides of the apparatus will, so long as the sides are straight, be continuous and in a straight line, but when the sliding block $H'$ reaches the ends of the ways the carriage G will become disconnected from the chain F, because the chain will drop away from the hook $g$, and as the chain L will continue to move it will turn the shaft $b$ around the geometrical center of the curved end of the floor A until the carriage G has been put into a position to engage with the chain F upon the opposite side of the machine from its first position, when the stirring-wheel will travel down the second straight side of the floor in the reverse direction from that in which it traveled up the straight side on which it was first engaged. The ways I carry guides $i^2$ for presenting the chain K to the sprocket-wheel $h^2$ in a proper position.

In this machine, when employed for the sprouting of malt, it is not proposed to employ the perforated floor which has been used in the patent apparatus of which this is an improvement, although it does require while sprouting to be occasionally stirred. Consequently, as a machine of this sort—an oblong machine—would present a greater surface of malt for the action of one stirrer than a machine with a circular floor, it is probable that a machine of this description would be better adapted for the sprouting operation than for the drying operation, and therefore would preferably be made with a close floor. In such case the floor would be made of hydraulic cement, which would retain moisture.

Having thus described the invention, what we claim, and desire to secure by Letters Patent, is—

1. In a malting-machine, a malting-floor oblong in shape, having parallel sides and semicircular ends, the straight sides of said walls equal in length to each other, and the curved sides of the inner and outer walls being concentric with each other, in combination with the stirring-drum B, mounted on the two shaft-carriages $b'$ and G, the inner endless chain F, and outer endless chain L, operating the shaft-carriages and drum, and the reciprocating shaft-carriage H' and its ways I, carrying the inner end of the stirring-drum shaft, substantially as described.

2. In an oblong malt-machine, the combination of the shaft-carriage G, having hook $g$, with the endless chain F, engaging said hook, and means for operating said chain, substantially as described.

3. In a malt-machine, the combination of the carriage H', the yoke H, pivoted in said carriage, bevel-gear $h'$ and sprocket $h^2$, having bearing in said carriage, shaft $b$, mounted in said yoke and carrying bevel-gear $h$, which engages the bevel-gear $h'$, and the operating-chain K, substantially as described.

4. The combination of the malting-floor having semicircular ends, with the stirring-drum B, the pivoted yoke H, and the exterior driving-chain L, substantially as described.

JOHN WASHINGTON FREE.
MICHAEL A. BARBER.

Witnesses:
WILLIAM H. JENNINGS, Jr.,
G. EVERETT HALL.